United States Patent [19]

Kaufman et al.

[11] Patent Number: 5,483,598
[45] Date of Patent: Jan. 9, 1996

[54] MESSAGE ENCRYPTION USING A HASH FUNCTION

[75] Inventors: Charles W. Kaufman, Northborough; Radia J. Perlman, Acton, both of Mass.

[73] Assignee: Digital Equipment Corp., Patent Law Group, Maynard, Mass.

[21] Appl. No.: 86,746

[22] Filed: Jul. 1, 1993

[51] Int. Cl.$^6$ .............................. H04L 9/20; H04L 9/22
[52] U.S. Cl. .............................................. 380/43; 380/44
[58] Field of Search ................................ 380/46, 44, 43, 380/45, 21

[56] References Cited

U.S. PATENT DOCUMENTS

| | | | |
|---|---|---|---|
| 4,160,120 | 7/1974 | Barnes et al. | 380/29 |
| 4,227,253 | 10/1980 | Ehrsam et al. | 375/2 |
| 4,910,773 | 3/1990 | Hazard et al. | 380/21 |
| 5,050,212 | 9/1991 | Dyson | 380/25 |
| 5,081,678 | 1/1992 | Kaufman et al. | 380/21 |
| 5,136,646 | 8/1992 | Haber et al. | 380/49 |
| 5,136,647 | 8/1992 | Haber et al. | 380/49 |
| 5,146,499 | 9/1992 | Geffrotin | 380/23 |
| 5,148,479 | 9/1992 | Bird et al. | 380/23 |
| 5,148,485 | 9/1992 | Dent | 380/46 |
| 5,163,096 | 11/1992 | Clark et al. | 380/4 |
| 5,177,790 | 1/1993 | Hazard et al. | 380/28 |
| 5,218,638 | 6/1993 | Matsumoto et al. | 380/23 |

*Primary Examiner*—Gilberto Barrón, Jr.
*Attorney, Agent, or Firm*—Christine M. Kuta; A. Sidney Johnston

[57] ABSTRACT

An encryption system employing a one-time key-pad uses a shared secret number and a one-way hash function with which both the originator and recipient of a message generate successive segments of a key-pad to encrypt and decrypt the message respectively. In one arrangement each key-pad segment is generated by applying the hash function to a combination of the secret number and the previous key-pad segment. In the other embodiment of the invention, each key-pad section is generated by applying the one-way hash function to a combination of the secret number and a corresponding segment of the ciphertext version of the message.

7 Claims, 3 Drawing Sheets

MESSAGE ENCRYPTION USING A HASH FUNCTION

FIELD OF THE INVENTION

This invention relates to an efficient encryption system employing a one-way hash function to encrypt data. More specifically it relates to an encryption system in which a one-way hash function is employed to generate successive segments of a pseudo-random number whose overall length is sufficient to encode an entire message.

BACKGROUND OF THE INVENTION

The encryption systems to which the invention relates make use of a fixed length secret "key", a message, and an encryption algorithm for computing a combination of the two called ciphertext with the property that someone knowing the secret key can efficiently compute the message from the ciphertext but someone not knowing the key cannot. The method used similar to that known in the literature as a "one-time pad". With a one-time pad, the "key" is not fixed length, but rather is a randomly chosen bit stream of the same size as the message and —as its name suggests—each key is only used once.

These systems are particularly applicable to messages in which the symbols are expressed in binary form. The key pad is then expressed as a bit stream and encryption is accomplished by applying a simple mathematical or logic function to the key pad and the message. A simple function to employ is the exclusive-OR. However, other functions, such as binary addition of the bit streams, may also be used. The message is recovered at the receiving end by reversing the encryption procedure, i.e. by applying to the key pad and the incoming ciphertext the inverse of the function used to encrypt the message. In the case of exclusive-OR encryption the message is recovered by passing the latter bit streams through an exclusive-OR circuit.

Since it is inconvenient to generate and securely deliver to sender and recipient large quantities of random bit streams, alternative designs use cryptographic pseudo-random number generators that are seeded with a fixed length secret known to both sender and recipient and produce identical bit streams for the sender and recipient but are not predictable by someone who does not know the fixed length secret. The most commonly known technique for doing this is called "Output Feedback Mode" (OFB). A related technique is called "Cipher Feedback Mode" (CFB"), in which the pseudo random stream is determined by the message itself as well as the fixed length secret. Both of these techniques are understood in the context of a reversible encryption algorithm like the "Data Encryption Standard" (DES). (See "*Data Encryption Standard*", Federal Information Processing Standards Publication No. 46, January 1977; "*DES Modes of Operation*", Federal Information Processing Standards Publication No. 81, December 1980)

Each of these arrangements has its advantages, depending on the requirements of users of the encryption system. In particular, OFB has the advantage of speed. Specifically, the key pad can be generated in advance of message transmission; encryption and decryption can therefore operate at the speed with which the input text and the key-pad bits can be combined, e.g., applied to a single exclusive-OR stage. That is, the speed of operation need not be limited by the speed with which the key-pad segments can be generated.

While the OFB has the advantages of a one-time key pad, it is susceptible to defeat by substitution of a bogus message. That is, if an intruder has access to the plaintext message and intercepts the ciphered message, he can reverse the operation of combining them, thereby recovering the key pad and then use the key pad to encode a substitute message.

CFB prevents message substitution by using successive segments of the ciphertext in generating successive segments of the key pad. An intruder can still recover the key pad in the manner described above. However, since the key pad is message-dependent, a substitute message that is enciphered using that key pad will be undecipherable to a meaningful symbol stream by the intended recipient of the original message. The attempt at message substitution will thus be discovered. However, this arrangement will be somewhat slower in operation than the first embodiment, since the key pad cannot be computed in advance of message origination.

SUMMARY OF THE INVENTION

The present invention generates the key pad by successive applications of a function that was designed for one-way transformations of data. As in prior systems, by some mechanism the two parties come to share a long-term, secret random number. The parties also share the initial value of a short-term random number, which need not be a secret. In accordance with the invention, a combination of the long-term and short-term numbers is applied to a key pad generator which applies a one-way hash function to its input and thereby generates the first segment of the one-time key pad. The next segment of the key pad is derived in the same manner, using as the value of the short-term number the first key-pad segment or a number derived therefrom. This procedure is iterated as many times as required to provide a key pad of sufficient length to encode the entire message.

More specifically the one-way hash generator generates, in response to its input, a fixed length output from which the input cannot be derived. Nor, as a practical matter, can the input be obtained by trial and error. For example, given a length of 128 bits for both the long-term secret number and the short-term number, and assuming that the value of the short-term number is known to an intruder, the intruder would have to find one out of more than $10^{38}$ possible input bit combinations for the generator. A trial-and-error approach to the derivation of these numbers would therefore not be expected to obtain them in any reasonable length of time. An example of a hash function suitable for this purpose is a message digest function such as that described by Rivest, "The MD-4 Message Digest Algorithm", *Advances in Cryptology—Crypto, '90*, Spruger—Verlag, LNCS.

Since a message pair (originator and recipient) using the invention start with the same long-term secret number and initial value of the short-term number and apply the same key-pad generating procedure to these numbers, they will derive the same key pad. Moreover, the key pad can be made as long as needed for encryption of the messages transmitted between the pair. Accordingly their communications have the advantages of encryption and decryption by one-time key pads, without the need to transmit the key pads.

In this connection it should be noted that only the first value of the short-term number needs to be transmitted between a message pair, since all the succeeding values are derived at both ends of the communications link.

In one embodiment of the invention, each key pad segment $KP_n$ is used directly as the short-term random number in the code generator to generate the next segment $KP_{n+1}$. This arrangement has advantages of the prior Output Feedback mode in that the key pad can be generated in advance of message transmission.

3

In another embodiment of the invention, successive segments of the ciphertext are used as the values of the short-term number in generating successive segments of the key pad. This arrangement has the advantages of the prior Cipher Feedback Mode.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1A:
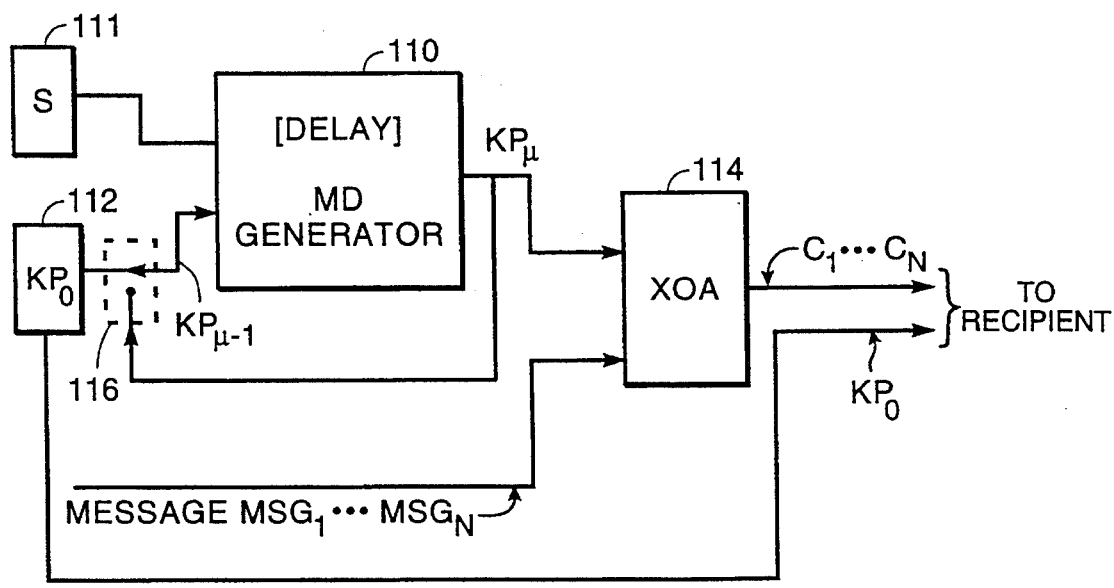
FIG. 1A is a diagram of an encryption unit that encrypts messages in accordance with a first embodiment of the invention.
Figure 1B:
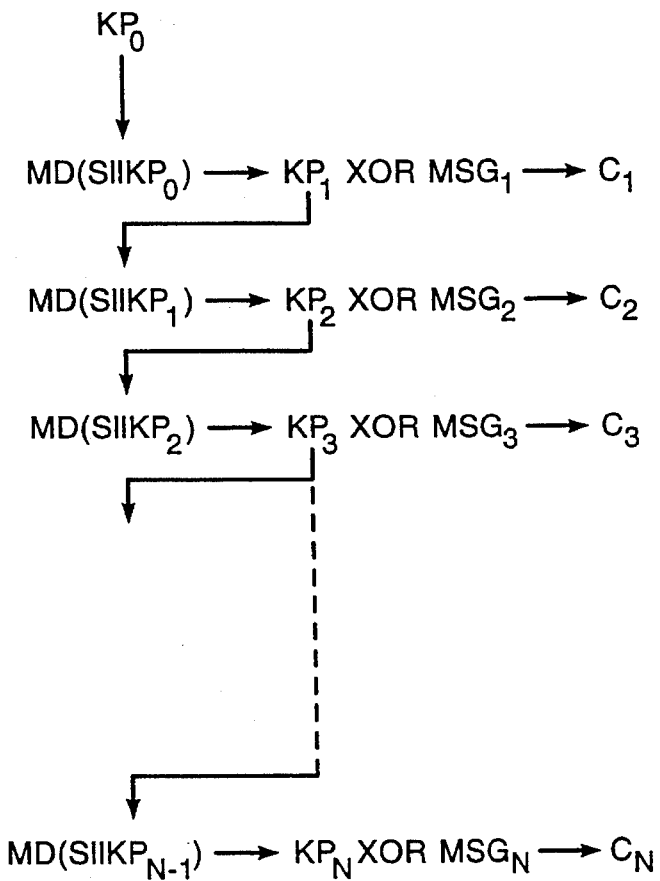
FIG. 1B is a flow diagram illustrating the operation of the encryption unit of FIG. 1A.

As shown in FIGS. 1A and 1B, an encryption unit incorporating a first embodiment of the invention includes hash code generator 110 which provides a one-way hash code of the concatenation of two numbers. One of these numbers is S, a long-term secret number contained in a register 111 and known to both the originator and recipient of a message, MSG, that is to be encrypted by the encryption unit depicted in FIG. 1A. The other number is a short-term number $KP_{n-1}$, whose initial value $KP_0$ is contained in a register 112. The generator 110 provides, as a resulting output, the value $KP_n$, which is a random-number key-pad segment used to encrypt a corresponding segment $MSG_n$ of the message. Thus the key-pad segment $KP_n$ is applied to an exclusive OR circuit (XOR) 14 along with the message segment $MSG_n$ of the message to be encrypted. The output of the XOR 114 is a segment $C_n$ of the ciphertext version to the message. The encrypted message, comprising the segments $C_1 \ldots C_N$, is transmitted to the recipient along with $KP_0$.

More specifically, the initial value $KP_0$ is passed to the generator 110 through a switch 116 to provide key-pad segment $KP_1$ and the resulting ciphertext segment $C_1$ corresponding with message segment $MSG_2$. The switch 116 is then moved to its other position to feed the number $KP_1$ back to the generator 10. In turn, this provides the next segment $KP_2$ of the key pad and thus the second segment $C_2$ of the ciphertext version of the message. These operations are repeated, with the successive key pad segments $KP_n$ being provided by the message digest generator 10 in response to the concatenated inputs S and $KP_{n-1}$. This operation implies a delay of one segment in the loop that includes the generator 10 and this delay is indicated in FIG. 1A as being included in the generator itself.

The last segment $KP_N$ of the key pad used to encode the message MSG may be used as the initial value $KP_0$ at the input of the generator 10 in generating the key pad for the next message. Thus only a single initial value of the short-term number needs to be transmitted between the originator and recipient of the messages.

4

Figure 2:
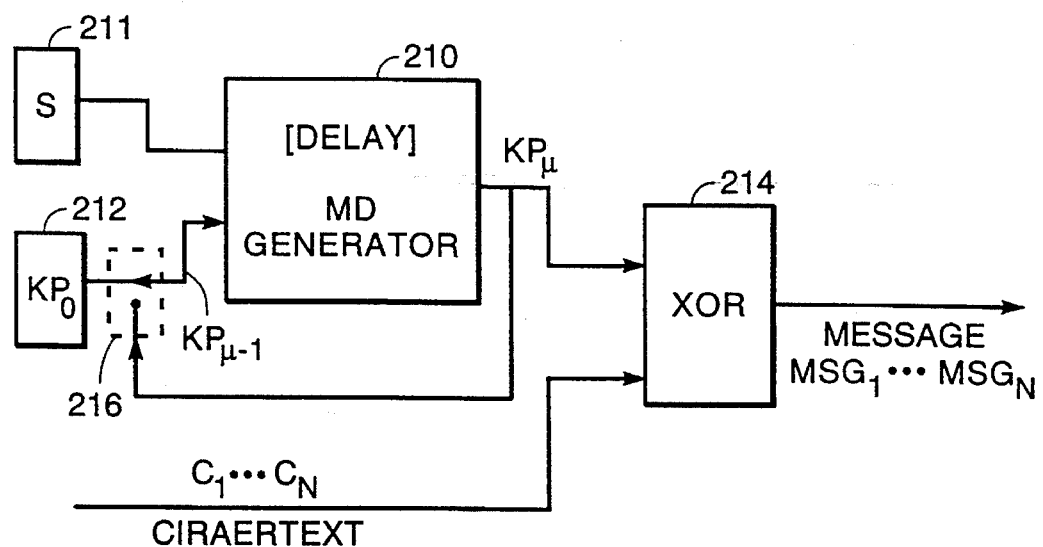
FIG. 2 is a diagram of a decryption unit used to recover messages encrypted by the unit depicted in FIG. 1.

The recipient of the ciphertext message generated by the system depicted in FIGS. 1A and 1B can decipher the message with identical equipment. Thus as shown in FIG. 2 the equipment at the receiving station includes a hash code generator 210 which receives the concatenation of the secret number S from a register 211 and, initially, a short term number value $KP_0$ from a register 212 by way of a switch 216. The output of the generator 210 is the random number key pad segment $KP_1$, which is applied to an XOR circuit 214 along with the corresponding segment $C_1$ of the ciphertext message. The output of the XOR circuit 212 is the recovered plaintext message segment $MSG_1$. As in the circuit of FIG. 1A, the switch 216 is shifted to its other position after the generation of the random number segment $KP_1$ so as to feed back the values $KP_{n-1}$ for the generation of subsequent segments $KP_n$ of the random-number key pad.

The generators 110 and 210 may generate hash codes in accordance with a message digest algorithm such as the $MD_4$ algorithm described by Rivest op cit. Also, while generators operate on the concatenations of the numbers, other combinations, such as their two's complement sums can be used as the generator inputs.

With the system of FIGS. 1 and 2, the key pad can be generated off-line. That is, it can be generated in advance of encryption and stored in registers at either or both ends of the communications link. This facilitates high speed operation, since the encryption and decryption accomplished by means of the XOR circuits 112 and 212 is a substantially faster operation than the generation of the random number segments by the hash code generators 110 and 210.

On the other hand, the system is susceptible to compromise by someone who knows a plaintext message MSG and intercepts the ciphertext version of the message. By applying the plaintext and ciphertext versions of the message to an XOR circuit, she can recover the key pad and use it to encipher a bogus message, which will be deciphered at the receiving end without an indication of its falsity. The encryption system depicted in FIGS. 3 and 4 uses the message itself in generating the key pad and is therefore immune to message substitution in this manner.

Figure 3A:
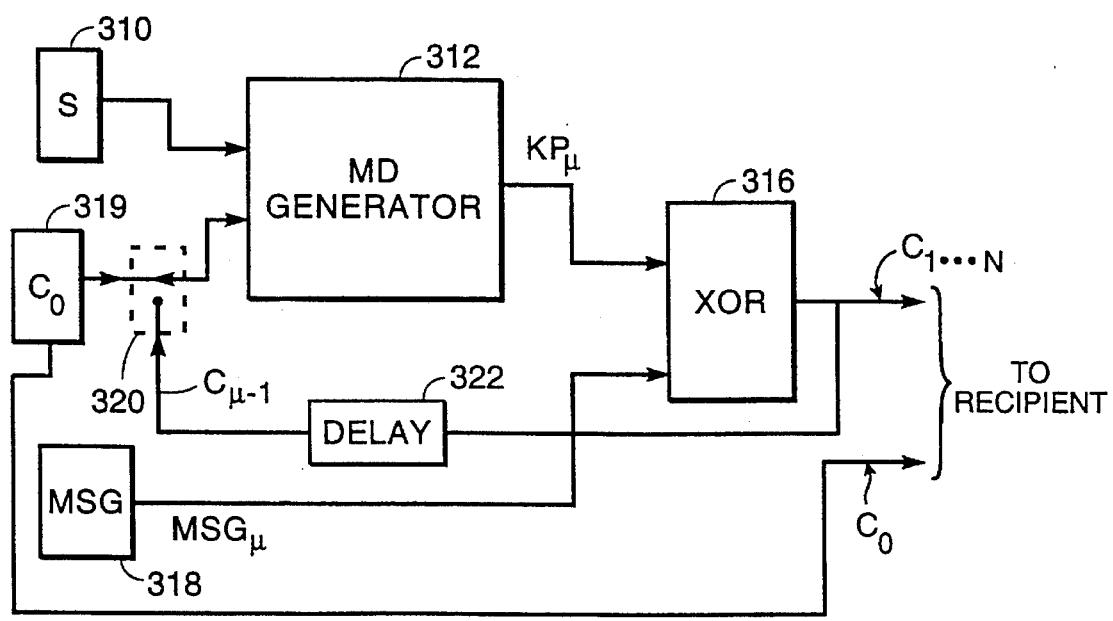
FIG. 3A is a diagram of an encryption unit that incorporates a second embodiment of the invention.
Figure 3B:
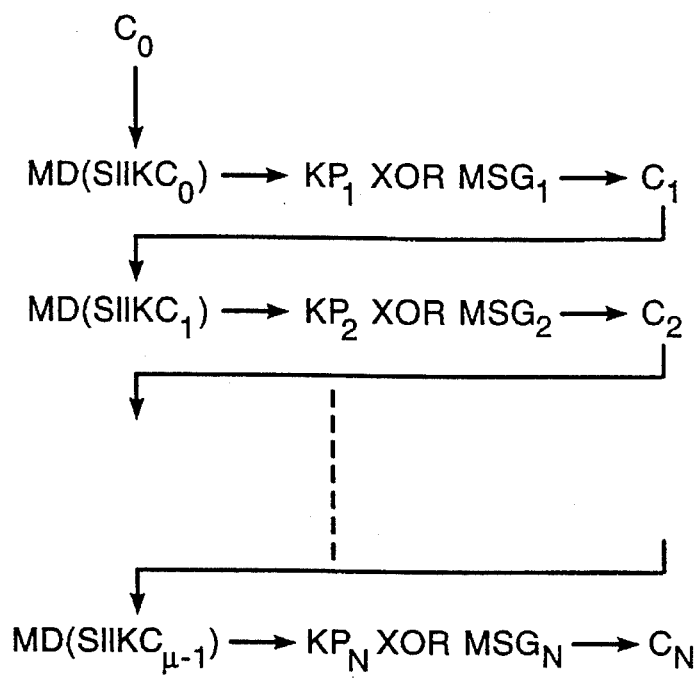
FIG. 3B is a flow diagram illustrating the operation of the encryption unit of FIG. 3A.

As shown in FIG. 3A and the accompanying flow diagram in FIG. 3B, the secret number S, contained in a register 310, is applied to a one-way hash code generator 312 along with a short-term random number $C_{n-1}$. The resulting output of the generator 312 is a key pad segment $KP_n$, which is applied to an XOR circuit 316 along with a message segment $MSG_n$ from a message source 318. The output of the XOR circuit 116 is the ciphertext segment $C_n$ corresponding with the message segment $MSG_n$.

More specifically, in the encryption unit of FIGS. 3A and 3B an initial value, $C_0$, of the short-term number is known to both the message originator and recipient. Usually $C_O$ will be selected by the message originator and transmitted to the recipient along with the encrypted message. This value, which is contained in a register 319, is applied to the generator 312, conceptually through a switch 320, to provide the first key-pad segment $KP_1$. In distinction from the encryptor of FIG. 1A, subsequent inputs to the generator 312 through switch 320 are from the XOR circuit 316, namely the successive ciphertext segments $C_n$, after a one-segment delay in a delay element schematically shown at 322.

Figure 4:
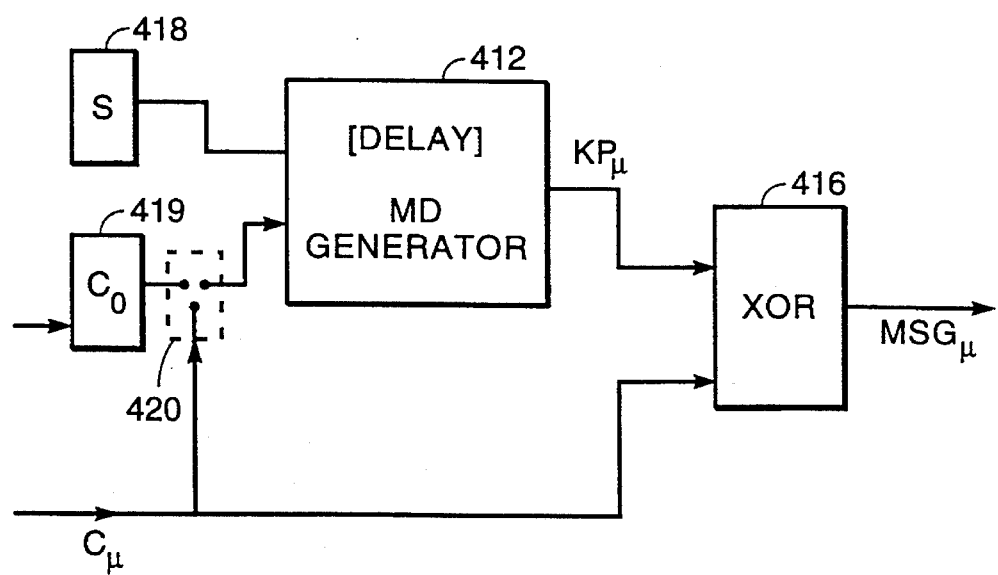
FIG. 4 is a diagram of a decryption unit used to recover messages encrypted by the system depicted in FIG. 3.

With reference to FIG. 4, a decryption unit used by the recipient of ciphertext messages encrypted as in FIGS. 3A and 3B includes a hash-code generator 412 that operates in accordance with the same hash-code function as the generator 312. The generator 412 receives the secret number S from a register 410 and, initially, the value $C_0$ from a register 419. The resulting key-pad segment $KP_1$ is applied to an XOR circuit 416, along with the first segment $C_1$ of the ciphertext message, to recover the first message segment $MSG_1$. Subsequently the generator 412 operates on the concatenation of S with successive ciphertext segments $C_n$ to generate the successive key pad segments $KP_{n+1}$. These key pad segments are applied to the XOR circuit 416 along with the corresponding ciphertext segments $C_{n+1}$ to recover the message segments $MSG_{n+1}$. This operation implies a one-segment delay in the hash-code generator 412 as indicated.

In the encryption system depicted in FIGS. 3 and 4, all of the key-pad segments after the first are derived from the message itself. As a result one cannot compromise the system by the substitution of a bogus message. Specifically, assume that someone knows the message intercepts the ciphertext message transmitted from the encryptor depicted in FIG. 3, recovers the key pad used to encrypt the message and uses that key pad to encrypt a substitute message. The decryption unit illustrated in FIG. 4 will decrypt the first segment of the message but will not decrypt any of the succeeding segments. Specifically, the key-pad segments provided by the generator 412, which are derived in part from the ciphertext segments $C_n$, will not be the same as the original key-pad segments used in encrypting the substitute message.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An encryption unit for encrypting a message comprising segments $MSG_n$, said unit making use of a long-term secret number S and a short-term number that are shared with a recipient of the message, said short-term number having a succession of values beginning with an initial value $C_0$, said system comprising:

A. means for generating a one-way hash function of a combination of S and $C_0$ to provide the first segment $KP_1$ of a one-time key pad,
    B. means for generating successive segments, $KP_n$, of said key pad by providing for each segment a one-way hash function of the combination of S with a function, $C_{n-1}$, of the previous key-pad segment, $KP_{n-1}$, and the message segment $MSG_{n-1}$
    C. whereby $C_1$ . . . are successive ciphertext segments corresponding with the message segments $MSG_1$ . . . .

2. The encryption unit of claim 1 in which said one-way hash function is a message digest function.

3. The encryption unit of claim 1 in which said function is the exclusive-OR combination of $KP_{n-1}$, and $MSG_{n-1}$.

4. A message transmission system for transmitting encrypted messages from an originator to a recipient, the originator and recipient having a shared long-term secret number and a short-term number having a succession of values, said system comprising:

A. an encryption unit including:
        1. means for applying a one-way hash function to a combination of said long-term secret number and successive values of said short term number to provide successive key-pad segments,
        2. means for calculating a function of each key-pad segment with a message segment to provide a ciphertext segment corresponding to said message segment, and
        3. means for applying each ciphertext segment as the value of the short term number used in generating the next key pad segment,
    B. a decryption unit including:
        1. means for applying said one-way hash function to the combination of said long-term secret number and successive values of said short term secret number and successive values of said short term secret number to provide a succession of key pad segments,
        2. means for applying the inverse of said function to said key pad segments and successive ciphertext segments to recover the message segments corresponding with the ciphertext segments, and
        3. means for applying to said hash function as the short term number values the same values used in said encryption unit.

5. The system defined in claim 4, in which said one-way hash function is a message digest function.

6. A method of encrypting a message for transmission from an originator to a recipient, said method comprising the steps of:

A. communicating between said originator and recipient a long-term secret number S and the initial value of a short-term number ST,
    B. applying a one-way hash function to a combination of S and successive values of ST to provide successive key-pad segments,
    C. calculating a function of each key-pad segment and a message segment to provide a ciphertext segment corresponding to said message segment, and
    D. applying each message segment or ciphertext segment as the value of S used in generating the next key-pad segment.

7. An encryption unit for transmitting a message, said unit comprising:

a switch having a first state and a second state, said switch switching from said first state to said second state in response to receiving an initial value of a short term number, said short term number having a succession of values;
    a one-way hash code generator coupled to said switch, said hash code generator having means for receiving said short term number from said switch, said hash code generator having means for receiving a long term secret number, said hash code generator producing key pad segments in response to said short term number and said long term number; and,
    an exclusive OR circuit coupled to said hash code generator, said exclusive OR circuit coupled to said switch, said exclusive OR circuit receiving said key pad segments from said hash code generator, said exclusive OR having means for receiving a message, said exclusive OR circuit producing ciphertext segments in response to said key pad segments and said message,
    said switch receiving said ciphertext segments from said exclusive OR circuit, said switch in said second state providing said ciphertext segments as the successive values of said short term number.

* * * * *